United States Patent
Wang et al.

(10) Patent No.: US 8,536,850 B2
(45) Date of Patent: Sep. 17, 2013

(54) HIGH SIDE CONTROLLER CAPABLE OF SENSING INPUT VOLTAGE AND OUPUT VOLTAGE OF A POWER CONVERSION CIRCUIT

(75) Inventors: Yen-Hui Wang, Taipei (TW); Wei-Chuan Su, Taipei (TW); Yu-Wen Chang, Taipei (TW)

(73) Assignee: Immense Advance Technology Corp., Taipei (TW)

( * ) Notice: Subject to any disclaimer, the term of this patent is extended or adjusted under 35 U.S.C. 154(b) by 383 days.

(21) Appl. No.: 12/880,380

(22) Filed: Sep. 13, 2010

(65) Prior Publication Data
US 2012/0062194 A1 Mar. 15, 2012

(51) Int. Cl.
*G05F 1/00* (2006.01)
*H03K 5/00* (2006.01)
*H05B 37/02* (2006.01)
*H02M 7/06* (2006.01)

(52) U.S. Cl.
USPC ............. 323/285; 363/126; 315/307; 327/94

(58) Field of Classification Search
USPC ................................. 323/282–285
See application file for complete search history.

(56) References Cited

U.S. PATENT DOCUMENTS

| | | | | |
|---|---|---|---|---|
| 4,404,479 | A * | 9/1983 | Toyomaki | 327/95 |
| 4,691,125 | A * | 9/1987 | Rybicki | 327/96 |
| 6,084,386 | A * | 7/2000 | Takahashi et al. | 323/273 |
| 6,124,743 | A * | 9/2000 | Yang | 327/198 |
| 6,794,922 | B2 * | 9/2004 | Mashimo | 327/336 |
| 6,958,920 | B2 * | 10/2005 | Mednik et al. | 363/19 |
| 7,196,499 | B1 * | 3/2007 | Lipcsei | 323/222 |
| 7,196,563 | B2 * | 3/2007 | Yuki et al. | 327/205 |
| 7,973,570 | B2 * | 7/2011 | Pigott et al. | 327/95 |
| 8,159,383 | B2 * | 4/2012 | Kumakura | 341/162 |
| 2005/0073351 | A1 * | 4/2005 | Ko et al. | 327/337 |
| 2006/0114033 | A1 * | 6/2006 | Nakasha et al. | 327/91 |
| 2011/0298390 | A1 * | 12/2011 | Su et al. | 315/291 |

* cited by examiner

*Primary Examiner* — Jue Zhang
*Assistant Examiner* — Henry Lee, III
(74) *Attorney, Agent, or Firm* — Ming Chow; Sinorica, LLC (57) ABSTRACT

A high side controller capable of sensing input voltage and output voltage of a power conversion circuit, including: a first switch, having a control end and two channel ends, the control end being coupled to a gate signal, and one of the two channel ends being coupled to a voltage signal, wherein the voltage signal is proportional to a negative version of the input voltage when the gate signal is active; an inverting amplification circuit, having an input end coupled to the other one of the two channel ends, and an output end for providing a first processed voltage; and a first sample and hold circuit, having a control input end coupled to the gate signal, an input end coupled to the first processed voltage, and an output end for providing a first sample voltage.

9 Claims, 5 Drawing Sheets

HIGH SIDE CONTROLLER CAPABLE OF SENSING INPUT VOLTAGE AND OUPUT VOLTAGE OF A POWER CONVERSION CIRCUIT

BACKGROUND OF THE INVENTION

1. Field of the Invention

The present invention relates to a power conversion controller, and more particularly to a high side controller capable of sensing input voltage and output voltage of a power conversion circuit to provide desirable performance.

2. Description of the Related Art

In the high side driver circuit of a general power conversion application, the positive end of an input voltage source is generally coupled to one end of the channel of a power transistor. When the power transistor is turned on by a control signal, the input power from the input voltage source will be transmitted through the power transistor to an inductor, and the potential difference between the other end of the channel of the power transistor and the negative end of the input voltage source will be approximately equal to the input voltage of the input voltage source. When the power transistor is turned off, the positive end of the input voltage source will be isolated by the power transistor, and, to keep the current continuity in the inductor, the potential difference between the other end of the channel of the power transistor and the negative end of the input voltage source will change polarity and amplitude accordingly.

To switch the power transistor, a high side controller is utilized to generate the control signal. As is often seen, the reference ground of the high side controller is coupled to the other end of the channel of the power transistor, so that a low voltage controller can be used to provide the control signal. However, as the potential difference between the other end of the channel of the power transistor and the negative end of the input voltage source varies in polarity and amplitude with time during switching operation, it is not easy to sense the input voltage of the input voltage source.

In view of this problem, the present invention proposes a mechanism for sensing input voltage and output voltage of a power conversion circuit via the negative end of an input voltage source, to provide desirable performance for the power conversion circuit.

SUMMARY OF THE INVENTION

The primary objective of the present invention is to propose a high side controller for a power conversion circuit, which is capable of sensing input voltage and output voltage of the power conversion circuit via the negative end of an input voltage source.

Another objective of the present invention is to propose a high side controller for a power conversion circuit, which can make use of the sensed input voltage and output voltage to generate an adaptive peak current reference signal to result in a regulated inductor current and an excellent power factor irrespective of the variations of the input voltage and output voltage.

To achieve the foregoing objectives of the present invention, a high side controller capable of sensing input voltage and output voltage of a power conversion circuit is proposed, the high side controller including: a first switch, an inverting amplification circuit, a first sample and hold circuit, a second switch, a second sample and hold circuit, a reference signal generator, and a comparator.

The first switch has a control end and two channel ends, the control end being coupled to a gate signal, and one of the two channel ends being coupled to a first voltage signal, wherein the first voltage signal is proportional to a negative version of the input voltage when the gate signal is active.

The inverting amplification circuit has an input end coupled to the other one of the two channel ends, and an output end for providing a first processed voltage.

The first sample and hold circuit has a control input end coupled to the gate signal, an input end coupled to the first processed voltage, and an output end for providing a first sample voltage.

The second switch has a control end and two channel ends, the control end of the second switch being coupled to a complementary version of the gate signal, one of the two channel ends of the second switch being coupled to a second voltage signal, and the other one of the two channel ends of the second switch being used to provide a second processed voltage, wherein the second voltage signal is proportional to the output voltage when the gate signal is inactive.

The second sample and hold circuit has a control input end coupled to the complementary version of the gate signal, an input end coupled to the second processed voltage, and an output end for providing a second sample voltage.

The reference signal generator has two input ends coupled to the first sample voltage and the second sample voltage respectively, and an output end for providing an adaptive peak current reference signal, wherein the adaptive peak current reference signal is generated by performing an adaptive arithmetic operation on the first sample voltage and the second sample voltage.

The comparator is used to generate the gate signal by comparing a current sensing signal with the adaptive peak current reference signal.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
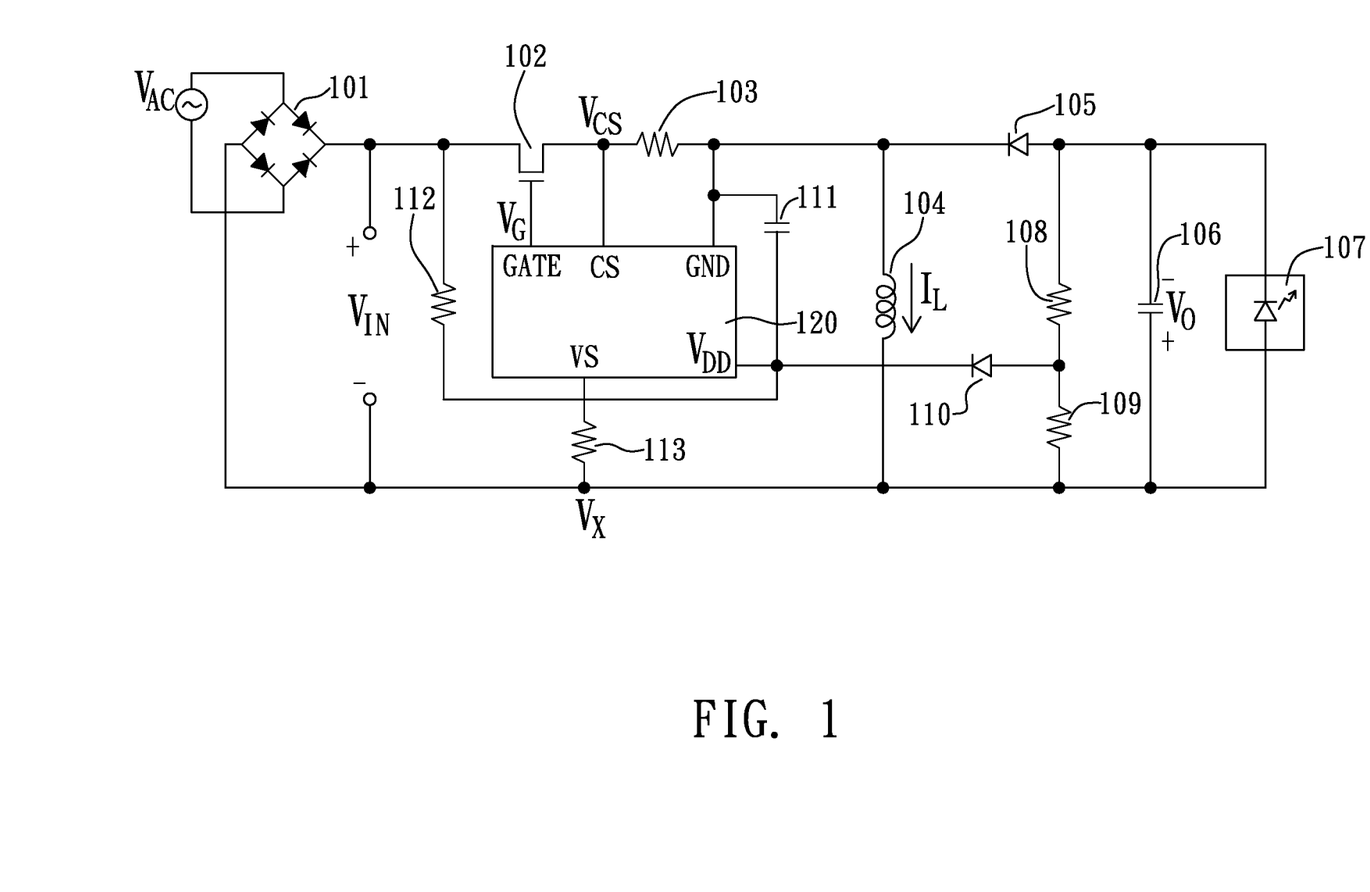
FIG. 1 is the architecture of a power conversion circuit for a LED lighting application, utilizing a high side controller according to a preferred embodiment of the present invention.

Please refer to FIG. 1, which illustrates the architecture of a power conversion circuit for a LED lighting application, utilizing a high side controller according to a preferred embodiment of the present invention. As illustrated in FIG. 1, the input voltage and output voltage of the power conversion circuit are $V_{IN}$ and $V_O$ respectively, and the power conversion circuit includes a bridge regulator 101, an NMOS transistor 102, a current sensing resistor 103, an inductor 104, a regulation diode 105, a filtering capacitor 106, a LED module 107, voltage division resistors 108~109, a diode 110, a capacitor 111, a startup resistor 112, a resistor 113 and a high side controller 120.

The bridge regulator 101 is used to perform a full-wave regulation on an AC power source $V_{AC}$ to generate the input voltage $V_{IN}$, of which the period is half of that of the AC power source $V_{AC}$.

The NMOS transistor 102, driven by a gate signal $V_G$, is used as a power switch. The current sensing resistor 103 is used to generate a current sensing signal $V_{CS}$ according to an inductor current $I_L$.

The inductor 104 is used to receive an input energy from the input voltage $V_{IN}$ when a charging current path—consisting of the NMOS transistor 102 and the resistor 103—is on, and deliver the input energy to the LED module 107 when the charging current path is off.

The regulation diode 105 is used to act as a unilateral switch and the filtering capacitor 106 is used to hold the output voltage $V_O$.

The LED module 107 is used as the load, and the value of the output voltage $V_O$ is determined by the number of LEDs contained in the LED module 107.

The resistors 108~109, the diode 110, the capacitor 111, and the startup resistor 112 are used to build up a bias voltage between a $V_{DD}$ pin and a GND pin of the high side controller 120.

The resistor 113 is used to couple a voltage signal $V_X$, which is at the negative end of the input voltage $V_{IN}$ and which exhibits $-V_{IN}$ with reference to the potential of the GND pin when the NMOS transistor 102 is on and exhibits $V_O$ with reference to the potential of the GND pin when the NMOS transistor 102 is off, to a VS pin of the high side controller 120.

The high side controller 120, supplied by the bias voltage on the capacitor 111, is used to sense the voltage signal $V_X$ to get the information of $V_{IN}$ and $V_O$ to generate an adaptive peak current reference signal by performing an adaptive arithmetic operation on $V_{IN}$ and $V_O$, and then generate the gate signal $V_G$ by comparing the current sensing signal $V_{CS}$ with the adaptive peak current reference signal, to regulate the current for the LED module 107.

Figure 2:
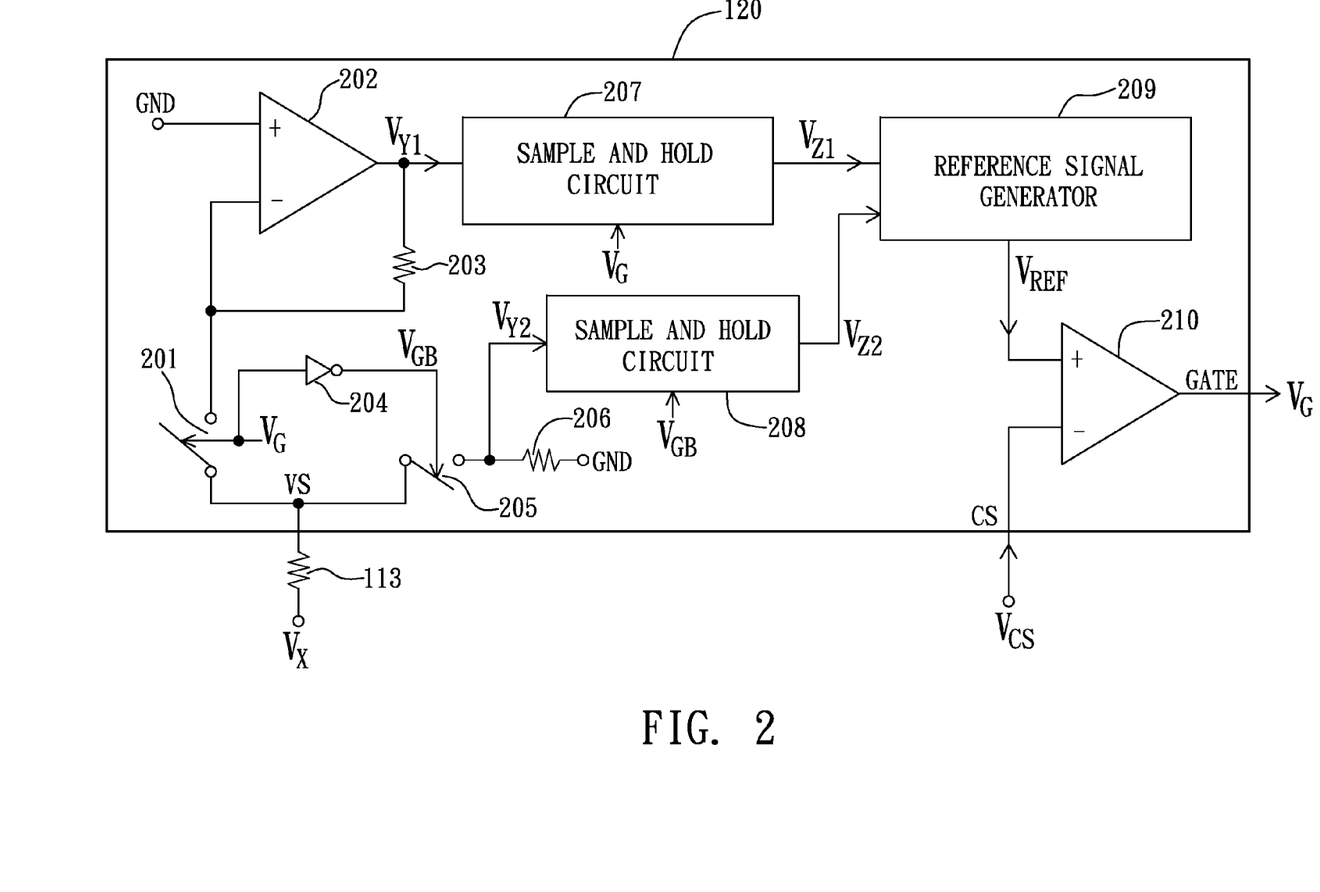
FIG. 2 is the block diagram of a preferred embodiment of the high side controller in FIG. 1.

The detailed block diagram of a preferred embodiment of the high side controller 120 is illustrated in FIG. 2. As illustrated in FIG. 2, the high side controller 120 includes a switch 201, an amplifier 202, a resistor 203, an inverter 204, a switch 205, a resistor 206, sample and hold circuits 207~208, a reference signal generator 209, and a comparator 210.

The switch 201 is controlled by the gate signal $V_G$ to enable an inverting amplification circuit—including the resistor 113, the amplifier 202, and the resistor 203. When the gate signal $V_G$ is active, for example at a high level, the switch 201 will be closed, and the voltage signal $V_X$ exhibiting $-V_{IN}$ in the meanwhile will be processed by the inverting amplification circuit to generate a first processed voltage $V_{Y1}$, which is equal to $V_{IN}\times$(resistance of the resistor 203/resistance of the resistor 113).

The inverter 204 is used to generate a complementary signal $V_{GB}$ of the gate signal $V_G$ to control the switch 205. When the gate signal $V_G$ is inactive (at a low level), the complementary signal $V_{GB}$ will be active (at a high level), the switch 205 will be closed, and the voltage signal $V_X$ exhibiting $V_O$ in the meanwhile will be processed by the resistor 113 and the resistor 206 to generate a second processed voltage $V_{Y2}$, which is equal to $V_O\times$(resistance of the resistor 206/(resistance of the resistor 113+resistance of the resistor 206)).

The sample and hold circuit 207 and the sample and hold circuit 208 are used to sample and hold the first processed voltage $V_{Y1}$ and the second processed voltage $V_{Y2}$ under the control of the gate signal $V_G$ and the complementary signal $V_{GB}$, to generate a first sample voltage $V_{Z1}$ and a second sample voltage $V_{Z2}$ respectively, wherein $V_{Z1}$ is proportional to $V_{IN}$ and $V_{Z2}$ is proportional to $V_O$.

The reference signal generator 209 is used to generate an adaptive peak current reference signal $V_{REF}$ according to an adaptive arithmetic operation utilizing the equations: $\sin\theta = V_{Z1}/(\text{amplitude of } V_{Z1})$, and $V_{REF} = K_1 \sin^2\theta \times (1+K_2 V_{Z2})/V_{Z1}$, wherein $K_1$ and $K_2$ are constants, and the equations can be implemented with an analog circuit or a mixed mode circuit. The comparator 210 is used to generate the gate signal $V_G$ by comparing the current sensing signal $V_{CS}$ with the adaptive peak current reference signal $V_{REF}$. The principle of the adaptive arithmetic operation of the reference signal generator 209 is elaborated as follows:

It is known that when in boundary mode, the inductor current $I_L$ increases from zero with a slope $V_{IN}/L$ during a $t_{ON}$ period, and decreases from a predetermined peak current $I_{PEAK}$ with a negative slope $-V_O/L$ during a $t_{OFF}$ period. The average of the inductor current $I_L$ can be expressed as $I_{AVG} = (t_{OFF}\times I_{PEAK})/(2\times(t_{ON}+t_{OFF})) = (V_{IN}\times I_{PEAK})/(2\times(V_{IN}+V_O))$. Therefore, if $I_{AVG}$ is to be a constant value $I_{CONST}$, then $I_{PEAK}$ should be determined according to the equation: $I_{PEAK} = I_{CONST}\times(V_{IN}+V_O)/V_{IN}$.

If the LED driver circuit is to have a unity power factor (PF=1)—average input current is in phase with the input voltage $V_{IN}$ ($=V_{IN,MAX}\times\sin\theta$), then the power delivered to the power conversion circuit will be proportional to $\sin^2\theta$. Further, as the power delivered to the LED module 107 can be expressed as $LI_{PEAK}^2/(2\times(t_{ON}+t_{OFF})) = (V_{IN}\times V_O\times I_{PEAK})/(2\times(V_{IN}+V_O))$, if the power factor is expected to be unity—i.e. $(V_{IN}\times V_O\times I_{PEAK})/(2\times(V_{IN}+V_O))$ is expected to be proportional to $\sin^2\theta$, then $I_{PEAK}$ should be set proportional to $\sin^2\theta\times(V_{IN}+V_O)/(V_{IN}V_O)$. Since $V_O$ is a constant for a specific design, the equation for $I_{PEAK}$ can be simplified as $I_{PEAK} = A^2\sin^2\theta\times(V_{IN}+V_O)/V_{IN}$, wherein A is a constant. What is amazing is that:

As $I_{PEAK} = I_{CONST}\times(V_{IN}+V_O)/V_{IN}$ is the formula for obtaining constant average current of the inductor current $I_L$, the formula $I_{PEAK} = A^2\sin^2\theta\times(V_{IN}+V_O)/V_{IN}$ can result in not only an excellent power factor (ideally equal to 1), but also corresponding constant average values of the inductor current $I_L$ for different angle values of $\theta$ (from 0 to 180 degrees), and thereby a constant mean of the constant average values of the inductor current $I_L$. Since $V_{Z1}$ is proportional to $V_{IN}$ and $V_{Z2}$ is proportional to $V_O$, once $V_{Z1}$ and $V_{Z2}$ are available, the adaptive peak current reference signal $V_{REF}(=I_{PEAK})$ generated by $V_{REF} = K_1\sin^2\theta\times(1+K_2 V_{Z2})/V_{Z1}$ can result in both an excellent power factor and a constant average of the inductor current $I_L$.

Figure 3:
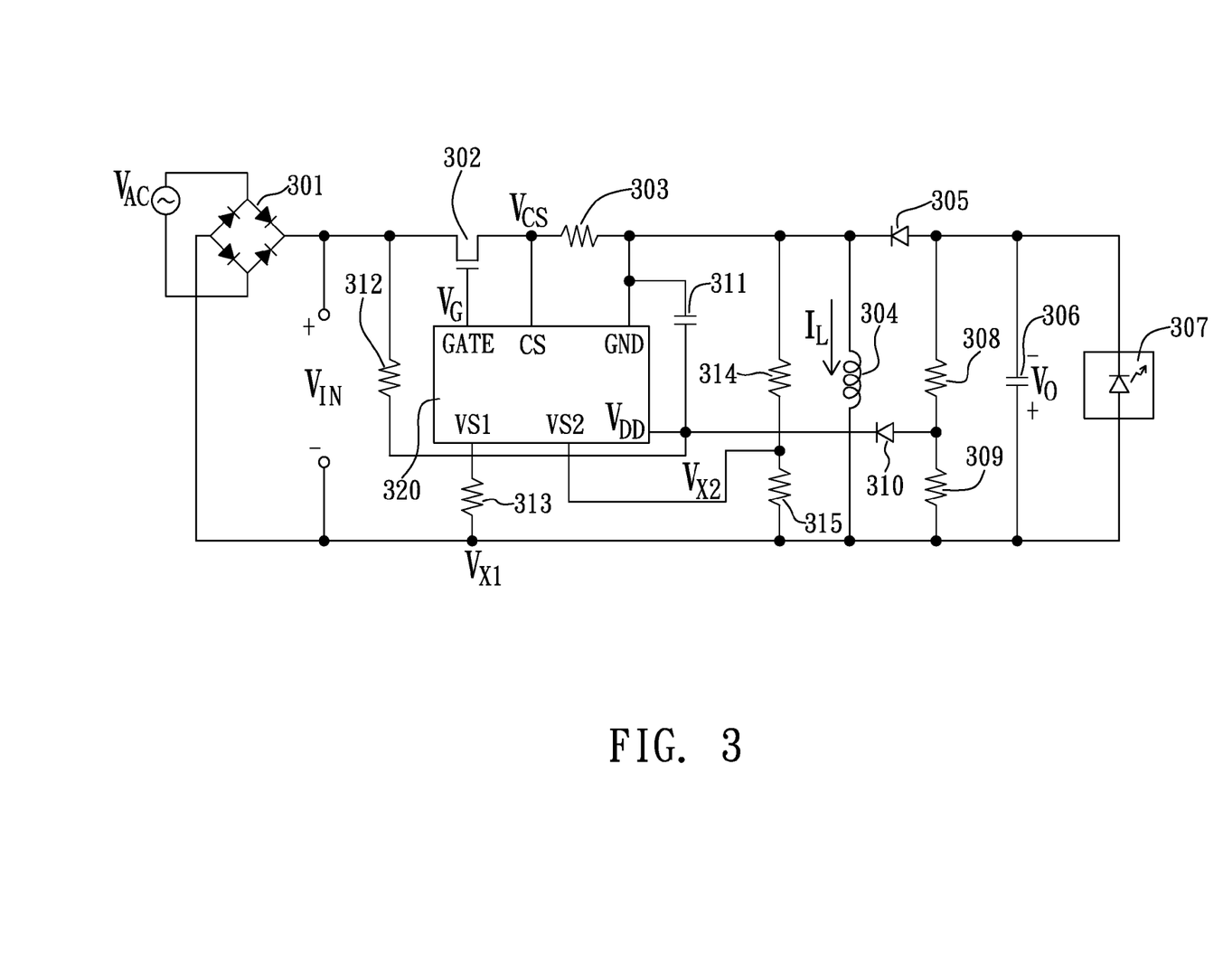
FIG. 3 is the architecture of a power conversion circuit for a LED lighting application, utilizing a high side controller according to another preferred embodiment of the present invention.

Based on the principles mentioned above, other modified embodiments are possible. Please refer to FIG. 3, which illustrates the architecture of a power conversion circuit for a LED lighting application, utilizing a high side controller according to another preferred embodiment of the present invention. As illustrated in FIG. 3, the input voltage and output voltage of the power conversion circuit are $V_{IN}$ and $V_O$ respectively, and the power conversion circuit includes a bridge regulator 301, an NMOS transistor 302, a current sensing resistor 303, an inductor 304, a regulation diode 305, a filtering capacitor 306, a LED module 307, voltage division resistors 308~309, a diode 310, a capacitor 311, a startup resistor 312, a resistor 313, resistors 314~315, and a high side controller 320.

The bridge regulator 301 is used to perform a full-wave regulation on an AC power source $V_{AC}$ to generate the input voltage $V_{IN}$, of which the period is half of that of the AC power source $V_{AC}$.

The NMOS transistor 302, driven by a gate signal $V_G$, is used as a power switch. The current sensing resistor 303 is used to generate a current sensing signal $V_{CS}$ according to an inductor current $I_L$.

The inductor 304 is used to receive an input energy from the input voltage $V_{IN}$ when a charging current path—consisting of the NMOS transistor 302 and the resistor 303—is on, and deliver the input energy to the LED module 307 when the charging current path is off.

The regulation diode 305 is used to act as a unilateral switch and the filtering capacitor 306 is used to hold the output voltage $V_O$.

The LED module 307 is used as the load, and the value of the output voltage $V_O$ is determined by the number of LEDs contained in the LED module 307.

The resistors 308~309, the diode 310, the capacitor 311, and the startup resistor 312 are used to build up a bias voltage between a $V_{DD}$ pin and a GND pin of the high side controller 320.

The resistor 313 is used to couple a first voltage signal $V_{X1}$, which is at the negative end of the input voltage $V_{IN}$ and which exhibits $-V_{IN}$ with reference to the potential of the GND pin when the NMOS transistor 102 is on, to a VS1 pin of the high side controller 320.

The resistors 314~315 are used to provide a second voltage signal $V_{X2}$, which exhibits $V_O \times$(resistance of the resistor 314/(resistance of the resistor 314+resistance of the resistor 315)) with reference to the potential of the GND pin when the NMOS transistor 302 is off, to a VS2 pin of the high side controller 320.

The high side controller 320, supplied by the bias voltage on the capacitor 311, is used to sense the first voltage signal $V_{X1}$ and the second voltage signal $V_{X2}$ to get the information of $V_{IN}$ and $V_O$ to generate an adaptive peak current reference signal by performing an adaptive arithmetic operation on $V_{IN}$ and $V_O$, and then generate the gate signal $V_G$ by comparing the current sensing signal $V_{CS}$ with the adaptive peak current reference signal, to regulate the current for the LED module 307.

Figure 4:
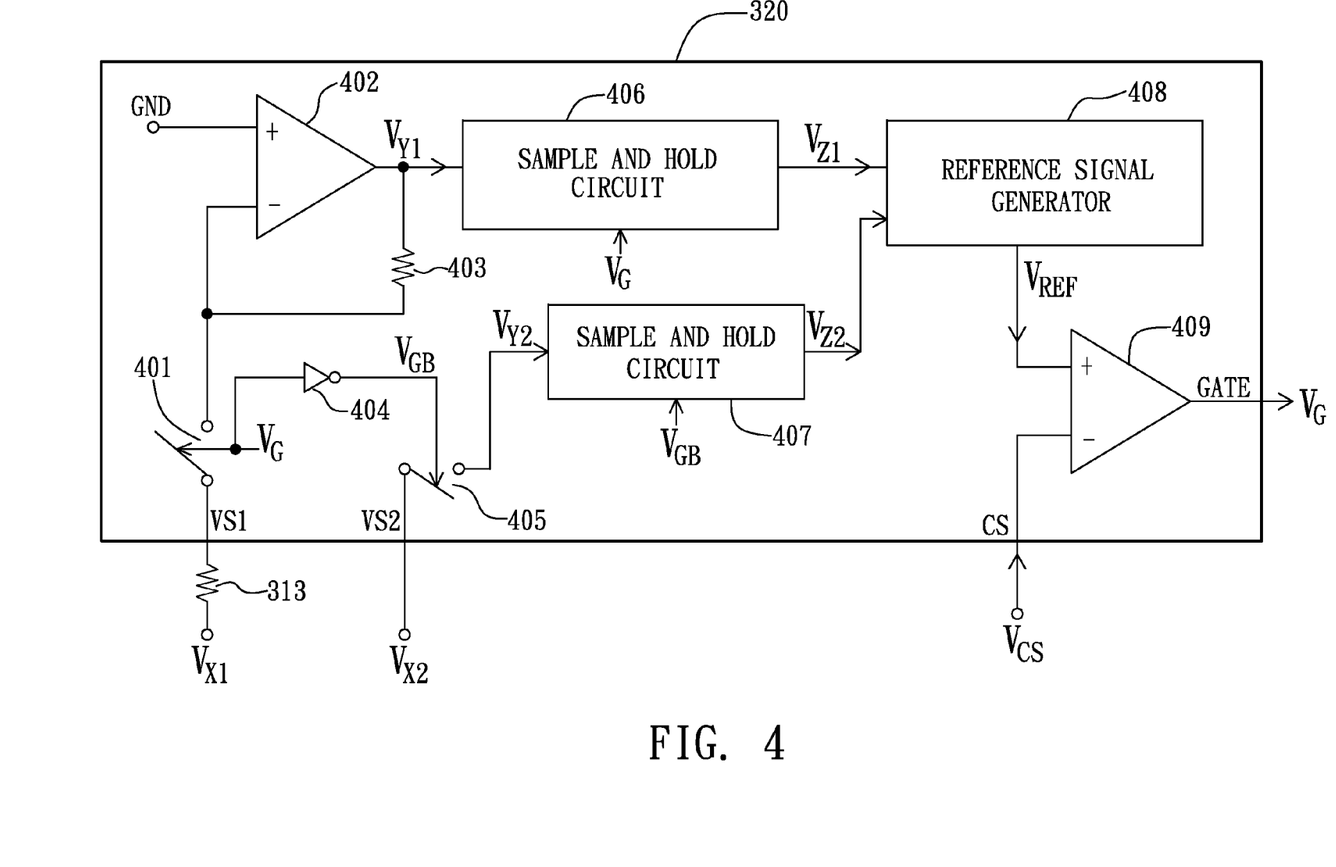
FIG. 4 is the block diagram of a preferred embodiment of the high side controller in FIG. 3.

The detailed block diagram of a preferred embodiment of the high side controller 320 is illustrated in FIG. 4. As illustrated in FIG. 4, the high side controller 320 includes a switch 401, an amplifier 402, a resistor 403, an inverter 404, a switch 405, sample and hold circuits 406~407, a reference signal generator 408, and a comparator 409.

The switch 401 is controlled by the gate signal $V_G$ to enable an inverting amplification circuit—including the resistor 313, the amplifier 402, and the resistor 403. When the gate signal $V_G$ is active, for example at a high level, the switch 401 will be closed, and the first voltage signal $V_{X1}$ exhibiting $-V_{IN}$ in the meanwhile will be processed by the inverting amplification circuit to generate a first processed voltage $V_{Y1}$, which is equal to $V_{IN} \times$(resistance of the resistor 403/resistance of the resistor 313).

The inverter 404 is used to generate a complementary signal $V_{GB}$ of the gate signal $V_G$ to control the switch 405. When the gate signal $V_G$ is inactive, for example at a low level, the complementary signal $V_{GB}$ will be active (at a high level), the switch 405 will be closed, and a second processed voltage $V_{Y2}$ will be generated according to the second voltage signal $V_{X2}$ which will be equal to $V_O \times$(resistance of the resistor 314/(resistance of the resistor 314+resistance of the resistor 315)) in the meanwhile.

The sample and hold circuit 406 and the sample and hold circuit 407 are used to sample and hold the first processed voltage $V_{Y1}$ and the second processed voltage $V_{Y2}$ under the control of the gate signal $V_G$ and the complementary signal $V_{GB}$, to generate a first sample voltage $V_{Z1}$ and a second sample voltage $V_{Z2}$ respectively, wherein $V_{Z1}$ is proportional to $V_{IN}$ and $V_{Z2}$ is proportional to $V_O$.

The reference signal generator 408 is used to generate an adaptive peak current reference signal $V_{REF}$ according to an adaptive arithmetic operation utilizing the equations: $\sin \theta = V_{Z1}/$(amplitude of $V_{Z1}$), and $V_{REF} = K_1 \sin^2 \theta \times (1+K_2 V_{Z2})/V_{Z1}$, wherein $K_1$ and $K_2$ are constants, and the equations can be implemented with an analog circuit or a mixed mode circuit. The comparator 409 is used to generate the gate signal $V_G$ by comparing the current sensing signal $V_{CS}$ with the adaptive peak current reference signal $V_{REF}$.

Figure 5:
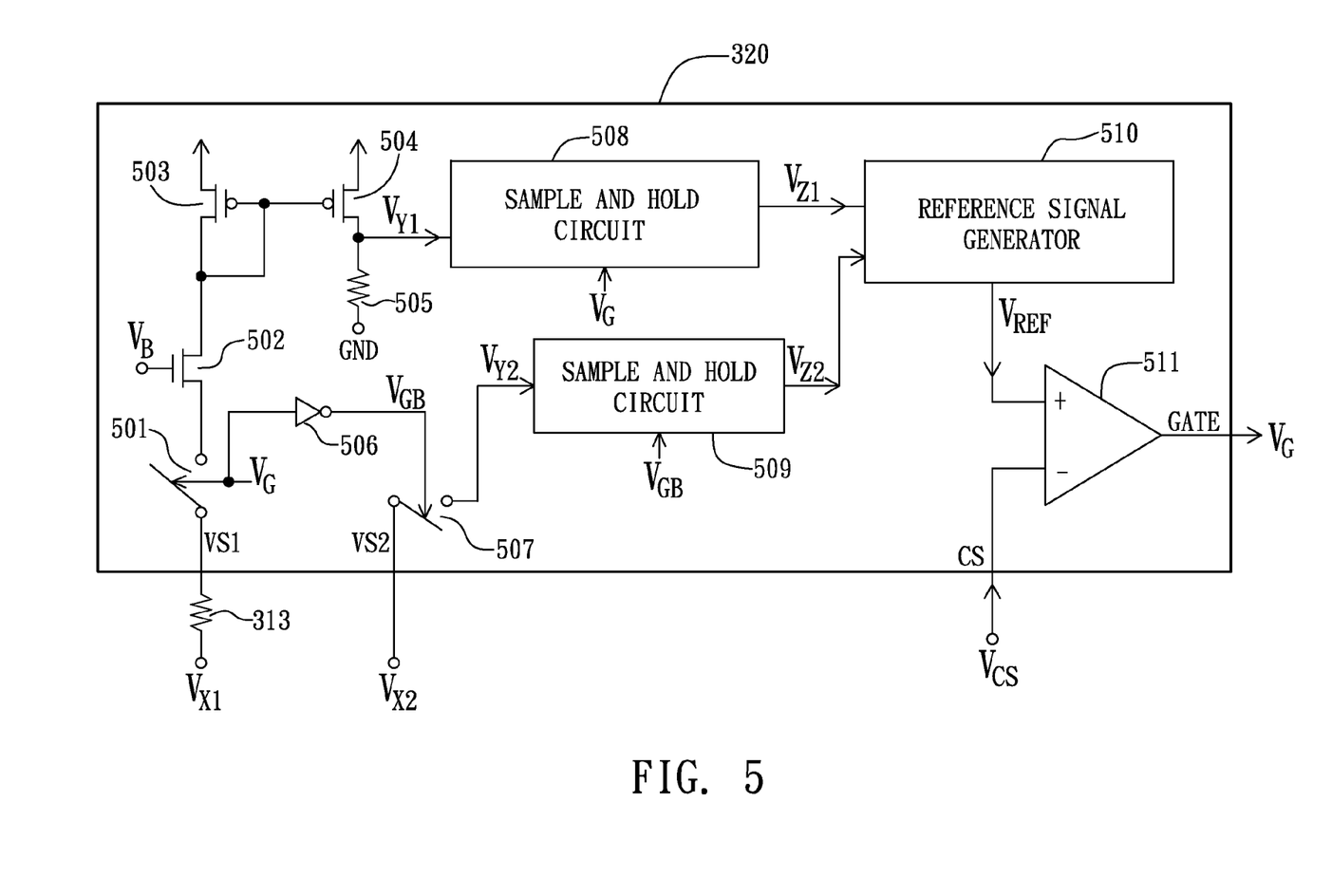
FIG. 5 is the block diagram of another preferred embodiment of the high side controller in FIG. 3.

Another preferred embodiment of the high side controller 320 is illustrated in FIG. 5. As illustrated in FIG. 5, the high side controller 320 includes a switch 501, an NMOS transistor 502, PMOS transistors 503~504, a resistor 505, an inverter 506, a switch 507, sample and hold circuits 508~509, a reference signal generator 510, and a comparator 511.

The switch 501 is controlled by the gate signal $V_G$ to enable an inverting amplification circuit—including the resistor 313, the NMOS transistor 502, the PMOS transistors 503~504, and the resistor 505, wherein the PMOS transistors 503~504 are used as a current mirror. When the gate signal $V_G$ is active (at a high level), the switch 501 will be closed, and the first voltage signal $V_{X1}$ exhibiting $-V_{IN}$ in the meanwhile will be processed by the inverting amplification circuit to generate a first processed voltage $V_{Y1}$, which is approximate to $V_{IN} \times$(resistance of the resistor 505/resistance of the resistor 313). The principle of the inverting amplification circuit is as follows: with a bias voltage $V_B$ set close to the threshold of the NMOS transistor 502, the source voltage of the NMOS transistor 502 is much smaller than $V_{IN}$ so that the current of the resistor 313 can be approximated as $V_{IN}/$(resistance of the resistor 313); a replica of the current of the resistor 313 is then generated from the PMOS transistor 504 of the current mirror; and finally the first processed voltage $V_{Y1}$ approximate to $V_{IN} \times$(resistance of the resistor 505/resistance of the resistor 313) is then generated on the top end of the resistor 505.

The inverter 506 is used to generate a complementary signal $V_{GB}$ of the gate signal $V_G$ to control the switch 507. When the gate signal $V_G$ is inactive (at a low level), the complementary signal $V_{GB}$ will be active (at a high level), the switch 507 will be closed, and a second processed voltage $V_{Y2}$ will be generated according to the second voltage signal $V_{X2}$ which will be equal to $V_O \times$(resistance of the resistor 314/(resistance of the resistor 314+resistance of the resistor 315)) in the meanwhile.

The sample and hold circuit 508 and the sample and hold circuit 509 are used to sample and hold the first processed voltage $V_{Y1}$ and the second processed voltage $V_{Y2}$ under the control of the gate signal $V_G$ and the complementary signal $V_{GB}$, to generate a first sample voltage $V_{Z1}$ and a second sample voltage $V_{Z2}$ respectively, wherein $V_{Z1}$ is proportional to $V_{IN}$ and $V_{Z2}$ is proportional to $V_O$.

The reference signal generator 510 is used to generate an adaptive peak current reference signal $V_{REF}$ according to an adaptive arithmetic operation utilizing the equations: $\sin \theta = V_{Z1}/$(amplitude of $V_{Z1}$), and $V_{REF} = K_1 \sin^2 \theta \times (1+K_2 V_{Z2})/V_{Z1}$, wherein $K_1$ and $K_2$ are constants, and the equations can be implemented with an analog circuit or a mixed mode circuit. The comparator 511 is used to generate the gate signal $V_G$ by comparing the current sensing signal $V_{CS}$ with the adaptive peak current reference signal $V_{REF}$.

As can be seen from the specification above, the high side controller of the present invention proposes a solution for sensing the voltage of $V_{IN}$ and $V_O$ in a floating ground environment, so that an excellent power factor and a constant average of the inductor current can be achieved by utilizing the information of $V_{IN}$ and $V_O$ in the illustrated application circuits, and the excellent power factor and the constant average of the inductor current are therefore irrespective of the variations of the input voltage and output voltage. It is to be noted that the aforementioned formulas utilizing the information of $V_{IN}$ and $V_O$ are for buck-boost circuits. If a buck circuit is under consideration, only the information of $V_{IN}$ is needed to attain a constant average of the inductor current and an excellent power factor. In fact, the high side controller of the present invention can offer an excellent power factor for buck, boost, or buck-boost circuits by generating the adaptive peak current reference signal $V_{REF}$ according to $V_{IN}$ due to the fact that the inductor current and thereby the input current will follow the adaptive peak current reference signal $V_{REF}$, and a power factor will be approaching unity if the input current follows in phase with the input voltage $V_{IN}$.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A high side controller capable of sensing input voltage and output voltage of a power conversion circuit, comprising:
   a first switch, having a control end and two channel ends, said control end being coupled to a gate signal, and one of said two channel ends being coupled to a voltage signal;
   an inverting amplification circuit, having an input end coupled to the other one of said two channel ends, and an output end for providing a first processed voltage;
   a first sample and hold circuit, having a control input end coupled to said gate signal, an input end coupled to said first processed voltage, and an output end for providing a first sample voltage;
   a second switch, having a control end and two channel ends, said control end of said second switch being coupled to a complementary version of said gate signal, and one of said two channel ends of said second switch being coupled to said voltage signal;
   a voltage divider, coupled to the other one of said two channel ends of said second switch to provide a second processed voltage; and
   a second sample and hold circuit, having a control input end coupled to said complementary version of said gate signal, an input end coupled to said second processed voltage, and an output end for providing a second sample voltage;
   wherein said voltage signal is proportional to a negative version of said input voltage when said gate signal is active, and proportional to said output voltage when said gate signal is inactive.

2. The high side controller capable of sensing input voltage and output voltage of a power conversion circuit as claim 1, further comprising
   a reference signal generator, having two input ends coupled to said first sample voltage and said second sample voltage respectively, and
   an output end for providing an adaptive peak current reference signal,
   wherein said adaptive peak current reference signal is generated by performing an adaptive arithmetic operation on said first sample voltage and said second sample voltage.

3. The high side controller capable of sensing input voltage and output voltage of a power conversion circuit as claim 2, further comprising a comparator, used to generate said gate signal by comparing a current sensing signal with said adaptive peak current reference signal.

4. The high side controller capable of sensing input voltage and output voltage of a power conversion circuit as claim 1, wherein said inverting amplification circuit comprises a current mirror.

5. A high side controller capable of sensing input voltage and output voltage of a power conversion circuit, comprising:
   a first switch, having a control end and two channel ends, said control end being coupled to a gate signal, and one of said two channel ends being coupled to a first voltage signal,
   wherein said first voltage signal is proportional to a negative version of said input voltage when said gate signal is active and said first voltage signal is proportional to said output voltage when said gate signal is inactive;
   an inverting amplification circuit, having an input end coupled to the other one of said two channel ends, and an output end for providing a first processed voltage;
   a first sample and hold circuit, having a control input end coupled to said gate signal, an input end coupled to said first processed voltage, and an output end for providing a first sample voltage;
   a second switch, having a control end and two channel ends, said control end of said second switch being coupled to a complementary version of said gate signal, one of said two channel ends of said second switch being coupled to a second voltage signal, and the other one of said two channel ends of said second switch being used to provide a second processed voltage, wherein said second voltage signal is proportional to said output voltage when said gate signal is inactive; and
   a second sample and hold circuit, having a control input end coupled to said complementary version of said gate signal, an input end coupled to said second processed voltage, and an output end for providing a second sample voltage.

6. The high side controller capable of sensing input voltage and output voltage of a power conversion circuit as claim 5, further comprising
   a reference signal generator, having two input ends coupled to said first sample voltage and said second sample voltage respectively, and an output end for providing an adaptive peak current reference signal,
   wherein said adaptive peak current reference signal is generated by performing an adaptive arithmetic operation on said first sample voltage and said second sample voltage.

7. The high side controller capable of sensing input voltage and output voltage of a power conversion circuit as claim 6, further comprising a comparator, used to generate said gate signal by comparing a current sensing signal with said adaptive peak current reference signal.

8. The high side controller capable of sensing input voltage and output voltage of a power conversion circuit as claim 5, wherein said inverting amplification circuit comprises a current mirror.

9. A high side controller capable of sensing input voltage and output voltage of a power conversion circuit, comprising:
   a first switch, having a control end and two channel ends, said control end being coupled to a gate signal, and one of said two channel ends being coupled to a first voltage signal, wherein said first voltage signal is proportional to a negative version of said input voltage when said gate signal is active and said first voltage signal is proportional to said output voltage when said gate signal is inactive;
   an inverting amplification circuit, having an input end coupled to the other one of said two channel ends, and an output end for providing a first processed voltage;
   a first sample and hold circuit, having a control input end coupled to said gate signal, an input end coupled to said first processed voltage, and an output end for providing a first sample voltage;
   a second switch, having a control end and two channel ends, said control end of said second switch being coupled to a complementary version of said gate signal, one of said two channel ends of said second switch being coupled to a second voltage signal, and the other one of said two channel ends of said second switch being used to provide a second processed voltage, wherein said second voltage signal is proportional to said output voltage when said gate signal is inactive;
   a second sample and hold circuit, having a control input end coupled to said complementary version of said gate signal, an input end coupled to said second processed voltage, and an output end for providing a second sample voltage;
   a reference signal generator, having two input ends coupled to said first sample voltage and said second sample voltage respectively, and an output end for providing an adaptive peak current reference signal, wherein said adaptive peak current reference signal is generated by performing an adaptive arithmetic operation on said first sample voltage and said second sample voltage; and
   comparator, used to generate said gate signal by comparing a current sensing signal with said adaptive peak current reference signal.

* * * * *